United States Patent [19]

Azuma et al.

[11] Patent Number: 4,733,875
[45] Date of Patent: Mar. 29, 1988

[54] VEHICLE HEIGHT CONTROL APPARATUS

[75] Inventors: Toshiyuki Azuma; Seiji Yamashita, both of Osaka; Koichi Hikichi, Tokyo; Morio Sato, Kanagawa, all of Japan

[73] Assignees: NEC Home Electronics Ltd., Osaka; Honda Giken Kogyo Kabushiki Kaisha, Tokyo, both of Japan

[21] Appl. No.: 853,958

[22] Filed: Apr. 21, 1986

[30] Foreign Application Priority Data

Apr. 22, 1985 [JP] Japan .................. 60-85670

[51] Int. Cl.$^4$ .............................. B60G 17/04
[52] U.S. Cl. ...................... 280/6 H; 280/707
[58] Field of Search ........ 280/6 R, 6 H, 707, DIG. 1, 280/714

[56] References Cited

U.S. PATENT DOCUMENTS

| | | | |
|---|---|---|---|
| 4,065,154 | 12/1977 | Glaze | 280/707 |
| 4,105,216 | 8/1978 | Graham et al. | 280/707 |
| 4,164,664 | 8/1979 | Kasiewicz | 280/707 |
| 4,468,050 | 8/1984 | Woods et al. | 280/DIG. 1 |
| 4,540,188 | 9/1985 | Meloche et al. | 280/6 R |

Primary Examiner—Ross Weaver
Attorney, Agent, or Firm—Staas & Halsey

[57] ABSTRACT

A vehicle height control device that includes a pressure sensor 28 for detecting the pressure of compressed air supplied to pneumatic shock absorbers 10 for pneumatically bearing the load of a vehicle loads applied through the wheels. A control circuit 30 is included for controlling vehicle height based on the pressure detected by the pressure sensor 28. A waveform shaping circuit is connected between the control circuit 30 and the pressure sensor 28 and shapes the waveform to moderate the pressure change while the pressure is rising to a greater degree than while the pressure is dropping. The waveform shaping circuit includes a passive low-pass filter circuit 38, an active low-pass filter circuit 52 and a pair of diodes 70 and 72. The diodes 70 and 72 connected to the active filter circuit 52, allowing rapid capacitor discharge during decreases in signal amplitude while maintaining a slow discharge rate during decreases in signal amplitude.

5 Claims, 5 Drawing Figures

VEHICLE HEIGHT CONTROL APPARATUS

BACKGROUND OF THE INVENTION

1. Field of the Invention

The present invention relates to a vehicle height control apparatus for controlling air pressure supplied to pneumatic shock absorbers to moderate pressure changes while the pressure is increasing and, more particularly, to an active filter that smooths rising edges of a pressure signal waveform.

2. Description of the Related Art

A motorcycle or automobile is equipped with coil spring or pneumatic shock absorbers between the body and both front and rear wheels. A conventional vehicle height control device 8 for a motorcycle, shown in FIG. 1, includes pneumatic shock absorbers 10 coupled to front forks 14 for a front wheel and rear cushions 16 for a rear wheel via pneumatic cylinders 12. Three way valves 18 are for supplying a fluid such as air to the pneumatic cylinders 12. A solenoid valve 20 is used as a front-to-rear switch and a solenoid relief valve 22 is coupled to the three way valves 18 through the solenoid valve 20. Air compressed by an air compressor 24 is supplied to the solenoid relief valve 22 through a drier 26 and the air at a desired pressure, is supplied from the solenoid relief valve 22 to the solenoid valve 20.

The solenoid relief valve 22 is equipped with a conventional pressure sensor 28 and, under instructions from a conventional control circuit 30 operated according to the outputs of the pressure sensor 28 and a vehicle height sensor 32, the pressure control action of the solenoid relief valve 22 and the switch action of the solenoid valve 20 are regulated. The control circuit 30 can be a height control computer or a discrete component control circuit such as described in U.S. Pat. Nos. 4,105,216 and 4,164,664 incorporated by reference herein. As shown in FIG. 2, the pressure sensor 28 is coupled to a conventional A/D converter 44 through a variable resistor 34 in the pressure sensor 28, the variable resistor 34 converts pressure changes into resistance changes (voltage changes). A resistor 36 and a low-pass filter circuit 38, including a resistor 40 and capacitor 42, along with the analog-to-digital (A/D) converter 44 convert the pressure changes into digital values and supply same to the control circuit 30.

The output of the pressure sensor 28, as illustrated in FIG. 3, represents the sharp changes resulting from vertical oscillation of the vehicle wheels rolling on a rugged road. The pressure sensor 28 signal waveform has large amplitude swings as shown by dot-dash line 46. The waveform is smoothed by the low-pass filter circuit 38 coupled to the pressure sensor 28, as shown by continuous line 48, resulting in a signal having relatively gentle amplitude changes.

Since the air in the pneumatic cylinder 12 is compressed in inverse proportion to the volume of the air chamber, the changes in the amplitude of the pressure show a high pressure rising ratio or steep slope as the pressure increases. Accordingly, a sharp pressure change having an acute or sharp peak is observed when the wheel has cleared a convex portion of the road surface.

The conventional vehicle height control device 8 requires amplitude control within or provided by the control circuit 30, because the output of the pressure sensor 28 fluctuates, particularly when the pressure is rising, to a greater degree than the variations in the actual road surface when the wheel is rolling on a wavy road surface. That is, the digital pressure requires smoothing to produce an average of the detected pressure. A conventional control circuit 30 is not capable of coping with rapid fluctuations in detected pressure and thus, produces inaccurate vehicle height control because of inaccurate pressure data.

SUMMARY OF THE INVENTION

An object of the present invention is to produce a more accurate pressure signal.

A further object of the present invention is to provide a pressure signal that is reduced in slope greater during pressure increases than during pressure drops.

A still further object of the present invention is to compress the pressure waveform into a range acceptable by a conventional A/D converter.

The present invention is intended to solve the problems of a conventional device. A vehicle height control device according to the present invention includes a pressure sensor for detecting the pressure of compressed air supplied to pneumatic shock absorbers for pneumatically bearing the load of a vehicle applied to the wheels. A control circuit is included for controlling vehicle height based on the pressure detected by the pressure sensor. A waveform shaping circuit is connected between the control circuit and the pressure sensor and shapes the waveform in such a manner that the pressure is moderated while the pressure is rising to a greater degree than while the pressure is dropping.

These together with other objects and advantages which will become subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
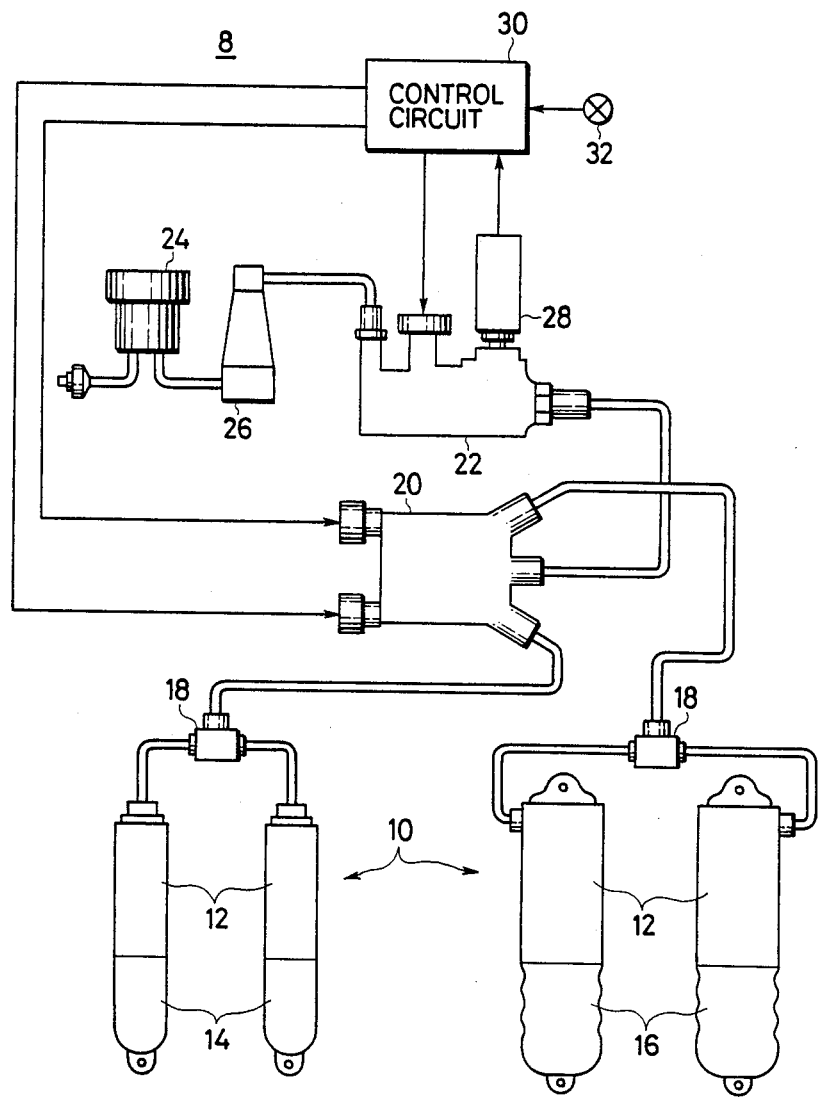
FIG. 1 illustrates a conventional vehicle height regulation device 8.
Figure 2:
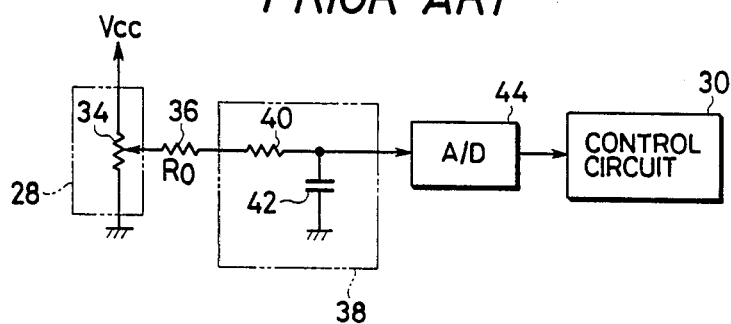
FIG. 2 depicts the electronic components of the conventional device 8.
Figure 3:
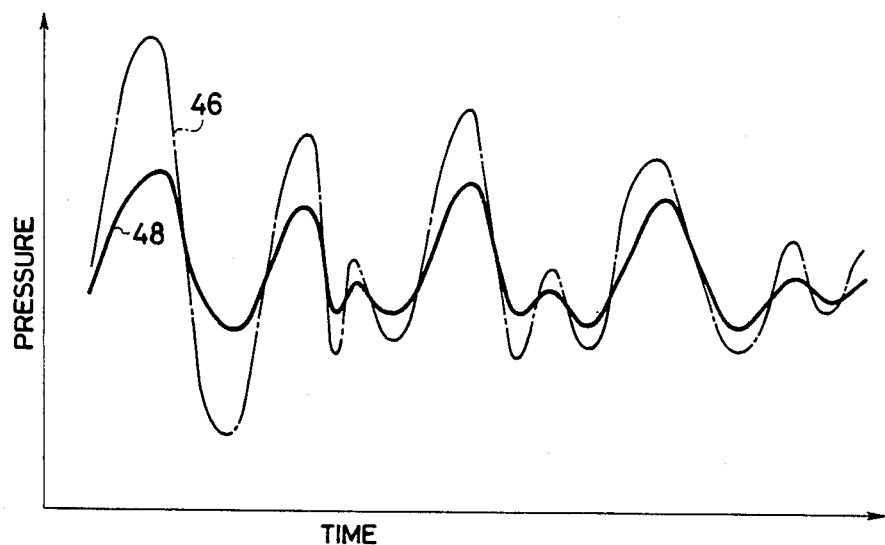
FIG. 3 is a graph of a pressure signal 46 provided by sensor 28 and a smoothed pressure signal 48.
Figure 4:
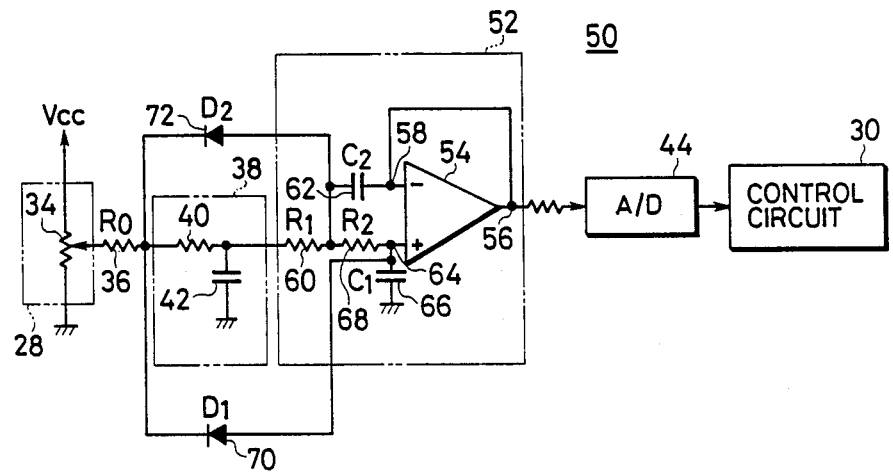
FIG. 4 depicts the electronic components of the present invention.

A vehicle height control device 50 according to the present invention includes a passive low-pass filter circuit 38, an A/D converter 44, an active low-pass filter circuit 52 and a pair of diodes 70 and 72. The active low pass filter circuit 52 helps act as a waveform shaping circuit connected between the low-pass filter circuit 38 and the A/D converter 44. The active filter circuit 52 includes an operational amplifier 54 having an output terminal 56 connected to an inverted input terminal 58 in a feedback arrangement. The inverted input terminal 58 is connected to a resistor $R_1$ (60) through a capacitor $C_2$ (62). A non-inverted input terminal 64 is grounded through a capacitor $C_1$ (66) and connected to the resistor $R_1$ (60) through resistor $R_2$ (68). Diodes $D_1$ (70) and $D_2$ (72) are respectively connected between the resistor $R_0$ (36) and the active low pass filter circuit 52, that is between the resistor $R_0$ (36) and the positive terminals of capacitors $C_1$ (66) and $C_2$ (62).

In the active low-pass filter circuit 52 connected to the diodes $D_1$ (70) and $D_2$ (72), the output $V_o$ relative to the input voltage $V_i$ will show a secondary harmonic response, having the following transfer function using a Laplace transformation S:

$$Vo/Vi = wo^2/\{S^2 + (wo/Q)S + wo^2\}$$

where $$wo = \{1/(R_1 \cdot R_2 \cdot C_1 \cdot C_2)\}^{\frac{1}{2}},$$

$$Q = (R_1 \cdot R_2 \cdot C_1 \cdot C_2)^{\frac{1}{2}}/\{C_1 \cdot (R_1 + R_2)\}$$

and the desired attenuating characteristics can be obtained by setting the following variables at appropriate values:

$$wo/Q = C_1 \cdot (R_1 + R_2)/(R_1 \cdot R_2 \cdot C_1 \cdot C_2)$$

Figure 5:
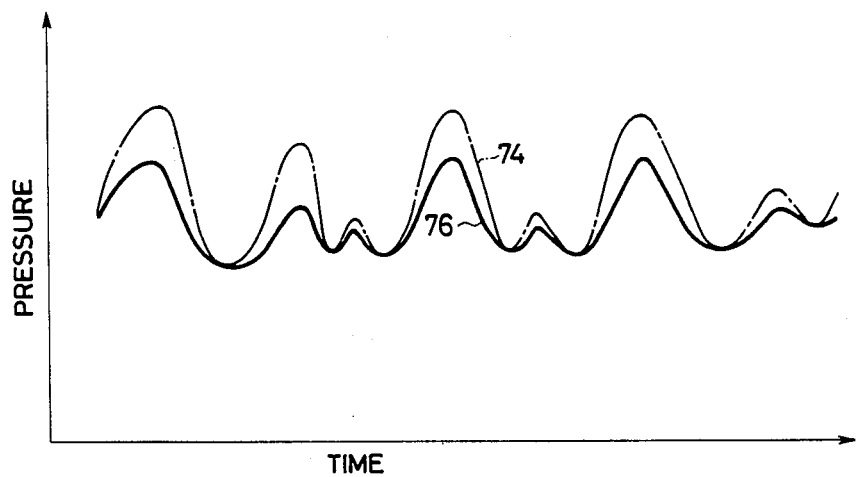
FIG. 5 is a graph of the pressure signals produced by the invention illustrated in FIG. 4.

Since the charging current for capacitors $C_1$ and $C_2$ is smaller, even without the diodes $D_1$ (70) and $D_2$ (72), while the output of the pressure sensor 28 is increasing, the pressure detected is prevented from increasing or rising in proportion to the increase in the charging time constant. On the other hand, since the discharge current from the capacitors $C_1$ (66) and $C_2$ (62) is greater than normal because of the diodes $D_1$ (70) and $D_2$ (72), as the output of the pressure sensor 28 decreases, the pressure detected will be reduced in proportion to the decrease in the discharge time constant due to the addition of the diodes $D_1$ and $D_2$. As a result, the smoothed pressure signal obtained from the low-pass filter circuit 38, as shown by the dot-dash line 74 of FIG. 5, produced while the wheel is made to run on a rugged road surface, is passed through the active low-pass filter circuit 52 and transformed into the continuous line 76 of FIG. 5. The transformed signal 76 has a gentle leading edge and a sharp trailing edge.

As a result, the output of the pressure sensor 28, particularly the crest or peak value on the high pressure side is compressed to produce a peak value within the range of the A/D converter 44 and the compression of the peak value on the low pressure side is suppressed, so that accurate pressure data for the air supplied to the front forks 14 and rear cushion 16 becomes available.

Because the vehicle height control device 50 includes the pressure sensor 28 for detecting the pressure of the compressed air supplied to the pneumatic shock absorbers 10 as well as the active low-pass filter circuit 52, used as a waveform shaping circuit, connected between the pressure sensor 28 and the control circuit 30 for controlling the vehicle height by changing air pressure, the waveform shaping circuit shapes the waveform to moderate the pressure change while the pressure is rising to a greater degree than while the pressure is dropping. The moderation occurs even when the air pressure, within the pneumatic buffer shock absorbers 10 suddenly rises while the wheel is rolling on a rugged road surface. As a result, the pressure being detected will be prevented from sharply increasing due to the waveform shaping action of the active low-pass filter circuit 52, allowing the control circuit 30 to determine and control vehicle height with increased accuracy.

The many features and advantages of the invention are apparent from the detailed specification and thus, it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described and accordingly, all suitable modifications and equivalents may be resorted to, falling within the scope of the invention.

What is claimed is:

1. A vehicle height control apparatus, receiving a vehicle height signal and controlling height using a pressurized fluid, said apparatus comprising:

pressure sensing means for producing a pressure signal waveform in dependence upon fluid pressure;

pressure signal compression means for amplitude compressing a rising portion of the pressure signal waveform more than a falling portion of the pressure signal waveform, a time constant of the falling portion of said pressure signal waveform being shorter than a time constant of the rising portion of said pressure signal waveform, causing the pressure to increase by a first speed during the rising portion and causing the pressure to decrease by a second speed faster than said first speed during the falling portion; and height control means for controlling vehicle height in dependence upon the compressed waveform and the vehicle height signal.

2. A vehicle height control apparatus receiving a vehicle height signal, comprising:

height adjustment means for adjusting vehicle height using a pressurized fluid;

pressure sensing means for sensing the pressure of the pressurized fluid and producing a pressure signal having rising and falling portions each having a slope;

waveform shaping means for smoothing the pressure signal by decreasing the slope of the rising portion more than the slope of the falling portion, a time constant of the falling portion of said pressure signal waveform being shorter than a time constant of the rising portion of said pressure signal waveform, causing the pressure to increase by a first speed during the rising portion and causing the pressure to decrease by a second speed faster than said first speed during the falling portion; and control means for controlling vehicle height in dependence upon the vehicle height signal and the smoothed pressure signal.

3. A vehicle height control apparatus receiving a vehicle height signal, comprising:

height adjustment means for adjusting vehicle height using a pressurized fluid;

pressure sensing means for sensing the pressure of the pressurized fluid and producing a pressure signal having rising and falling portions each having a slope;

waveform shaping means for smoothing the pressure signal by decreasing the slope of the rising portion more than the slope of the falling portion, said waveform shaping means comprising:

a passive low-pass filter operatively connected to said pressure sensing means;

a active low-pass filter operatively connected to said passive low-pass filter; and a pair of diodes operatively connected between said pressure sensing means and said active low-pass filter; and control means, operatively connected to said active low-pass filter, for controlling vehicle height in dependence upon the vehicle height signal and the smoothed pressure signal.

4. A vehicle height control apparatus, comprising:

a height control device for controlling vehicle height with a pressurized fluid;

a fluid pressure sensor connected to said height control device;

a passive low-pass filter operatively connected to said fluid pressure sensor;

an active low-pass filter connected to said passive low-pass filter;

a pair of diodes operatively connected between said fluid pressure sensor and said active low-pass filter;

an A/D converter connected to said active low-pass filter; and a height control circuit connected to said A/D converter and said height control device.

5. An apparatus as recited in claim 4, wherein said active low-pass filter comprises:

an operational amplifier having inverted and non-inverted inputs and having an output connected to the inverted input and said A/D converter;

a first capacitor connected to the inverted input;

a second capacitor connected between the non-inverted input and ground;

a first resistor connected to said passive low-pass filter and said first capacitor; and a second resistor connected to the non-inverted input, said first resistor and said first capacitor, and wherein said pair of diodes includes:

a first diode operatively connected between said first capacitor and said sensor; and a second diode operatively connected between the non-inverted terminal and said sensor.

* * * * *